UNITED STATES PATENT OFFICE.

SETH W. EELLS, OF MANSFIELD, OHIO.

IMPROVEMENT IN WRITING-FLUIDS.

Specification forming part of Letters Patent No. 25,184, dated August 23, 1859.

*To all whom it may concern:*

Be it known that I, SETH W. EELLS, of Mansfield, in the county of Richland and State of Ohio, have discovered a new and Improved Mode of Making Writing-Fluid; and I do hereby declare that the following is a full and exact description thereof, reference being had to the accompanying sample.

The nature of my discovery is in combining the following articles, viz; indigo, fuming (Nordhausen) sulphuric acid, iron, tannin, oil of cloves, creosote, and water.

To enable others skilled in the art to made and use my discovery, I will proceed to describe its proportions and combinations.

Dissolve one ounce of pulverized indigo in three or more ounces of the above-named acid in a proper vessel that will hold two or more gallons. Take in bulk three or more gallons of ground oak or other bark containing tannin. Boil it in water to get the tannin in a decoction less than one gallon. Strain and add it to the sulphate of indigo. Make carbonate of protoxide of iron to neutralize the above acid by taking seven ounces (more or less) of copperas and the same amount of sal-soda or carbonate of soda. Dissolve them in water separately. Mix and collect the precipitate. Add this precipitate to the above by degrees, and at the same time and by degrees add oil of cloves and creosote to break down the foam by stirring, because the carbonic-acid gas that is liberated by the combination of acid and iron produces an effervescence whose foam holds exposed to the atmosphere in minute division the dissolved indigo, sulphate of protoxide of iron, and tannin, all of which have great affinity for oxygen, which injures these substances in the composition, the creosote and oil of cloves spread over the top of the solution forming a stratum, which breaks the gas-bubbles and causes them to return to the fluid mass, and at the same time and after this floating stratum is a great protection to keep the oxidizable ingredients from the air. The exposure of this indigo and the sulphate of protoxide of iron to the air in that or any other way, so as to combine with a certain quantity of oxygen, precipitates them, also changes the tannin into gallic acid. In the use of the indigo it is necessary to have the least quantity of oxygen in the materials possible. Hence tannin is better than gallic acid. To this add water to make one gallon.

What I claim as my discovery, and desire to secure by Letters Patent, is—

The manner of combining the above materials so as to prevent the oxidation of the indigo and the other coloring ingredients, as above specified.

SETH W. EELLS.

Attest:
JOHN S. HOLLINGSHEAD,
J. A. ROWLAND.